United States Patent [19]

Cailly et al.

[11] Patent Number: 4,954,293

[45] Date of Patent: Sep. 4, 1990

[54] SEPARATION OF THORIUM AND RARE EARTH VALUES FROM FLUORIDE CONCENTRATES THEREOF

[75] Inventors: Francinet Cailly; Frederic Fabre, both of Paris, France

[73] Assignee: Rhone-Poulenc Chimie, Courbevoie, France

[21] Appl. No.: 276,665

[22] Filed: Nov. 28, 1988

[30] Foreign Application Priority Data

Nov. 27, 1987 [FR] France ................ 87 16452

[51] Int. Cl.$^5$ .................. C01F 15/00; C01F 17/00
[52] U.S. Cl. .................. 252/625; 423/3; 423/11; 423/21.1; 423/21.5; 423/8; 423/252
[58] Field of Search ............ 423/3, 11, 252, 21.1, 423/21.5, 8; 252/625

[56] References Cited

U.S. PATENT DOCUMENTS

| | | | |
|---|---|---|---|
| 1,307,153 | 6/1919 | Ryan | 423/6 |
| 1,335,157 | 3/1920 | Dietsche | 423/252 |
| 2,915,363 | 12/1959 | Lakeland | 423/252 |
| 2,995,419 | 8/1961 | Koshland et al. | 423/11 |
| 3,146,063 | 8/1964 | Moore et al. | 423/252 |
| 3,619,128 | 11/1971 | Angstadt | . |
| 4,461,748 | 7/1984 | Sabot et al. | 423/21.5 |
| 4,744,960 | 5/1988 | Floreancig et al. | 423/21.5 |

FOREIGN PATENT DOCUMENTS

| | | |
|---|---|---|
| 0206906 | 12/1986 | European Pat. Off. . |
| 0209448 | 1/1987 | European Pat. Off. . |
| 0216687 | 4/1987 | European Pat. Off. . |
| 0216688 | 4/1987 | European Pat. Off. . |
| 845666 | 8/1939 | France . |
| 2102402 | 2/1983 | United Kingdom . |

OTHER PUBLICATIONS

E. L. Chuvilina, et al., "Reaction of Rare Earth Element Fluorides with Solutions of Sodium Carbonate and Hydroxide", Chemical Abstracts, vol. 103, No. 152663b (1985), p. 736.

*Primary Examiner*—Edward A. Miller
*Attorney, Agent, or Firm*—Burns, Doane, Swecker & Mathis

[57] ABSTRACT

Thorium and rare earth values are separated from a fluoride concentrate thereof, by decomposing such concentrate with aqueous sodium hydroxide under conditions such that the amount of sodium hydroxide is at least 1.4 times the stoichiometric amount and the initial sodium hydroxide/water ratio in the medium of decomposition ranges from 1 to 40% by weight, whereby a precipitate of thorium hydroxide and rare earth hydroxides is produced, together with a solution of sodium fluoride, and then separating the NaF solution therefrom.

16 Claims, No Drawings

SEPARATION OF THORIUM AND RARE EARTH VALUES FROM FLUORIDE CONCENTRATES THEREOF

BACKGROUND OF THE INVENTION

1. Field of the Invention:

The present invention relates to the separation of thorium and rare earth values from fluoride concentrates of such elements.

2. Description of the Prior Art:

The recovery and separation of thorium and rare earth values from fluoride concentrates thereof presents an industrial problem that is extremely difficult to resolve in light of the marked insolubility of these fluorides in an acid medium.

This problem is quite considerable, as a variety of processes exist in the rare earth art which produce such concentrates.

SUMMARY OF THE INVENTION

Accordingly, a major object of the present invention is the provision of a simple and effective process for the separation and recovery of thorium and rare earth values from fluoride concentrates thereof.

Briefly, the present invention features the separation of thorium and the rare earths from a concentrate of fluorides of at least one of these elements, comprising decomposing such concentrate with water and sodium hydroxide under conditions such that the amount of sodium hydroxide used is at least 1.4 times the stoichiometric amount and the initial sodium hydroxide/water ratio in the medium of decomposition ranges from 1 to 40% by weight, whereby a precipitate of thorium hydroxide and the rare earth hydroxides is produced, together with a solution of sodium fluoride, and then separating said NaF solution therefrom.

DETAILED DESCRIPTION OF THE PREFERRED EMBODIMENTS OF THE INVENTION

More particularly according to the present invention, the subject process is applicable to concentrates of fluorides of thorium and the rare earths. By the term "concentrate" is intended any mixture in the solid state containing one or more fluorides of at least one of the above elements. By the term "rare earths" are intended the elements of the lanthanide series, as well as yttrium.

The process of the invention is especially applicable to concentrates containing cerium, for example up to 50% by weight thereof, as well as to those containing, whether or not in combination with cerium, either greater or lesser amounts of thorium, for example up to 40% by weight thereof, with such amounts being expressed in terms of the oxides thereof per 100% of the oxides of the rare earths or thorium.

Such concentrates may be produced by any known means, for example by the precipitation of rare earths and thorium utilizing HF, NaF, NH4F, etc., from solutions containing the rare earths and thorium, or from the various liquid/liquid extraction processes.

According to the process of the invention, the concentrate is decomposed by sodium hydroxide. The reactions which occur are as follows:

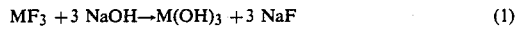

$$MF_3 + 3 NaOH \rightarrow M(OH)_3 + 3 NaF \quad (1)$$

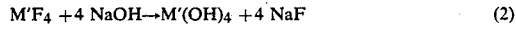

$$M'F_4 + 4 NaOH \rightarrow M'(OH)_4 + 4 NaF \quad (2)$$

wherein M represents at least one of the rare earth elements and M' is either thorium or cerium, in the tetravalent state.

Although the above reactions appear to be simple, it has now been found that to precipitate the thorium and rare earth hydroxides as completely as possible, it is necessary to carry out such reactions under specific operating conditions. Outside these conditions, the yields may be insufficient or even zero from an industrial standpoint.

One of the conditions is that the amount of sodium hydroxide used be at least 1.4 times the stoichiometric amount as reflected in the Equations (1) and (2) above.

In a preferred embodiment of the invention, the operating conditions are such that the amount of sodium hydroxide used is at least 1.5 and even more preferably from 1.6 to 3 times the stoichiometric amount.

Another condition is the initial sodium hydroxide concentration in the solution of decomposition (attack solution). The conditions must be such that the initial sodium hydroxide/water ratio, i.e., in practice the concentration of the sodium hydroxide attack solution, ranges from 1% to 40% b weight.

In a preferred embodiment of the invention, this concentration is at least 5% and more preferably ranges from 10% to 30%.

The temperature of the decomposition is not critical. In actual practice, it ranges from approximately 50° to the boiling point of the reaction medium.

The duration of the decomposition is generally on the order of several hours, for example from 2 to 3 hours.

The decomposition may be carried out in any suitable apparatus. The concentrate and the sodium hydroxide are introduced, and then the amount of water required to satisfy the above conditions is added.

After the decomposition, a precipitate of thorium and the rare earths, and a solution of sodium fluoride are realized, which are separated by any suitable means.

As the precipitate may contain insoluble trace amounts of sodium fluoride, it is preferable to wash it, either with water, or with a sodium hydroxide solution advantageously having a sodium hydroxide concentration within the aforesaid range for the sodium hydroxide concentration in the reaction medium during the decomposition.

In another preferred embodiment of the invention, the sodium hydroxide is recovered, for recycling, from the solutions resulting from the decomposition or the wash.

Two embodiments are possible for this purpose.

The first embodiment entails concentrating the aforementioned solutions such as to precipitate the sodium fluoride. The solution purified of NaF is then recycled into the attack zone after the addition of caustic (lime), if necessary.

The second embodiment entails adding caustic to the same solutions such as to precipitate the calcium fluoride, then concentrating and recycling it.

The precipitate of the hydroxides of thorium and rare earths purified of the fluoride may then be treated in different fashions to separate the thorium from the rare earths.

A first method comprises dissolving the precipitate in an acid solution. A nitric or hydrochloric acid solution may be used. Its acidity typically ranges from 0.5 to 1 N.

It will be appreciated that in order to effect a complete dissolution of the rare earths, it is important that the precipitate should not contain too much or very little fluoride.

Once the dissolution is carried out, the thorium and optionally cerium (IV) may precipitate, whereby a rare earth solution is produced.

A second technique again comprises preparing a solution of the precipitate in an acid medium, as described above. Thorium and the rare earths may be separated by liquid/liquid extraction utilizing such extractants as organic phosphoric acid esters, for example tributyl phosphate.

In order to further illustrate the present invention and the advantages thereof, the following specific examples are given, it being understood that same are intended only as illustrative and in nowise limitative.

EXAMPLE 1:

This example demonstrates the influence of the stoichiometric amount of the sodium hydroxide used for the decomposition reactions.

The concentrate treated was a mixture of thorium fluoride (10.8% by weight) and rare earth fluorides (89.2% by weight).

The respective proportions of the different rare earths were the following (expressed in terms of the oxides thereof relative to 100% of the rare earth oxides):

| | |
|---|---|
| $La_2O_3$ | 23% |
| $CeO_2$ | 46.5% |
| $Pr_6O_{11}$ | 5.1% |
| $Nd_2O_3$ | 18.4% |
| $Sm_2O_3$ | 2.3% |
| $Eu_2O_3$ | 0.07% |
| $Gd_2O_3$ | 1.7% |
| $Tb_4O_7$ | 0.15% |
| $Dy_2O_3$ | 0.50% |
| $Ho_2O_3$ | 0.08% |
| $Er_2O_3$ | 0.12% |
| $Tm_2O_3$ | 0.013% |
| $Yb_2O_3$ | 0.061% |
| $Lu_2O_3$ | 0.006% |
| $Y_2O_3$ | 2.0%. |

The fluorine content of the concentrate was 28.3%.

The decompositions were carried out by means of a °% by weight sodium hydroxide solution. The reaction was carried out at the boiling temperature for 2 h.

The basic solution containing the NaF formed and the unreacted excess sodium hydroxide were separated by filtration and the fluorine content determined in said solution.

The precipitate was washed. It was taken up in nitric acid at pH 1, at 80.C, in order to solubilize the rare earth and thorium hydroxides formed during the decomposition; the proportion of the insoluble residue was noted and the fluorine determined in the nitric acid solution.

The results obtained are reported below:

| Stoichiometry selected | Percentage of fluorine solubilized in the basic solution | Percentage by weight of unreacted material, after being taken up in $HNO_3$ |
|---|---|---|
| 1 | 76 | 20% |
| 1.2 | 87 | 11% |
| 1.5 | ≧97 | 0% |
| 2 | ≧97 | 0% |

It will thus be seen that when the stoichiometry utilized approached 1.5, total solubilization of the rare earths was obtained, together with a good fluorine/rare earth separation.

EXAMPLE 2:

This example demonstrates the effect of the NaOH concentration during decomposition.

Decomposition was carried out using a stoichiometry of 2 under the conditions of Example 1, but with variable sodium hydroxide concentrations. The precipitate was washed and treated as in Example 1.

The results obtained are reported below:

| NaOH concentration (weight %) | Fluorine stabilized in the basic solution | Percentage by weight of unreacted material, taken up in nitric acid, pH 1 |
|---|---|---|
| 5% | ≧97% | 0% |
| 20% | ≧97% | 0% |
| 30% | ≧97% | 0% |
| 40% | 97% | 1% |
| 50% | 90% | 9.5% |

These results evidence that it is necessary to avoid an excessively concentrated sodium hydroxide.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the separation of thorium and rare earth values from a fluoride concentrate thereof, comprising decomposing such concentrate with aqueous sodium hydroxide under conditions such that the amount of sodium hydroxide is at least 1.4 times the stoichiometric amount and the initial sodium hydroxide/water ratio in the medium of decomposition ranges from 1% to 30% by weight, whereby a precipitate of thorium hydroxide and rare earth hydroxides is produced, together with a solution of sodium fluoride, and then separating the NaF solution therefrom.

2. The process as defined by claim 1, wherein the amount of sodium hydroxide is at least 1.5 times the stoichiometric amount.

3. The process as defined by claim 2, wherein the amount of sodium hydroxide ranges from 1.6 t o 3 times the stoichiometric amount.

4. The process as defined by claim 1, wherein the medium of decomposition comprises a 1% to 30% concentrated aqueous solution of sodium hydroxide.

5. The process as defined by claim 4, wherein the medium of decomposition comprises an at least 5% concentrated aqueous solution of sodium hydroxide.

6. The process as defined by claim 5, wherein the medium of decomposition comprises a 10% to 30% concentrated aqueous solution of sodium hydroxide.

7. The process as defined by claim 1, further comprising washing the precipitated thorium and rare earth hydroxides with water or an aqueous solution of sodium hydroxide.

8. The process as defined by claim 1, further comprising concentrating the solution of decomposition to precipitate sodium fluoride therefrom.

9. The process as defined by claim 7, further comprising concentrating the wash solution to precipitate sodium fluoride therefrom.

10. The process as defined by claim 8, further comprising recycling the concentrated solution of decomposition.

11. The process as defined by claim 1, further comprising adding caustic to the solution of decomposition to precipitate calcium fluoride therefrom, and then concentrating and recycling same.

12. The process as defined by claim 7, further comprising adding caustic to the wash solution to precipitate calcium fluoride therefrom, and then concentrating and recycling same.

13. The process as defined by claim 1, further comprising selectively separating the thorium hydroxide and the rare earth hydroxides from the precipitate thereof.

14. The process as defined by claim 13, said selective separation comprising liquid/liquid extraction.

15. The process as defined by claim 1, said fluoride concentrate comprising cerium values.

16. The process as defined by claim 1, said fluoride concentrate comprising thorium values.

* * * * *